Aug. 17, 1965

G. DE MALGLAIVE 3,201,012

VALVE FOR FLUID DISPENSER

Filed Dec. 10, 1962

INVENTOR.
Gabriel de Malglaive
BY
Ooms, McDougall and Hersh
Att'ys

United States Patent Office 3,201,012
Patented Aug. 17, 1965

3,201,012
VALVE FOR FLUID DISPENSER
Gabriel de Malglaive, Pontarme, France, assignor to Seciven-Societe d'Exploitation de Chimie Industrielle Voituriez & Norman, Catenoy (Oise), France
Filed Dec. 10, 1962, Ser. No. 243,308
Claims priority, application France, Dec. 20, 1961, 882,542
5 Claims. (Cl. 222—501)

The present invention relates to a fluid dispensing means and in particular to an improved valve means for fluid dispensers. The valve means of this invention is particularly suitable for use with dispensers which maintain fluids under pressure such as the so-called "aerosol" containers.

In many instances valve means employed with fluid dispensers have been composed at least partially of metallic members and proper sealing in such constructions has been a distinct problem. In other instances where needle or ball valves have been employed as closure means for ducts of small cross section, the ducts have become clogged, and, accordingly, the valve construction has proved unsuitable. This is particularly true when the material to be dispensed tends to harden when exposed to air.

It is an object of this invention to provide an improved valve structure which overcomes the aforementioned difficulties in that proper seals can be obtained with the construction and the tendency toward clogging of the discharge ducts in the construction is virtually eliminated.

It is a further object of this invention to provide an improved valve construction which is economical to manufacture and which provides means for adjusting fluid discharge whereby a progressive and controlled dispensing operation can be accomplished.

These and other objects of this invention will appear hereinafter and for purposes of illustration but not of limitation, specific embodiments of this invention are shown in the accompanying drawings in which.

The valve construction of this invention is, as noted, capable of providing a highly efficient sealing relationship between the components included therein. The construction provides an arrangement wherein internal pressure, preferably reinforced by spring means, normally urges the valve components into the sealing position. Discharge of fluids from a container utilizing the valve construction can be controlled in a very simple manner and the construction permits the use of semiautomatic means for dispensing specific amounts of fluid.

The particular valve construction comprises a hollow frustroconical member adapted to be disposed around the relatively large open end of a container and sealed with respect to this container. A dispensing outlet is defined by the hollow member and a piston means adapted to snugly interfit with the internal walls of the hollow member is mounted for movement from a closing position to the dispensing position. Spring means are provided for normally urging the piston means to the closing position and the spring means are situated whereby the internal pressure exerted by the fluid in the container will augment the action of the spring means.

In order to dispense fluid from the container, actuating means accessible from outside the container are adapted to move the piston means away from the closing position. These actuating means can also be operated to close off communication between the interior of the container and the interior of the hollow member whereby a metered amount of fluid can be dispensed from the container.

Figure 1:
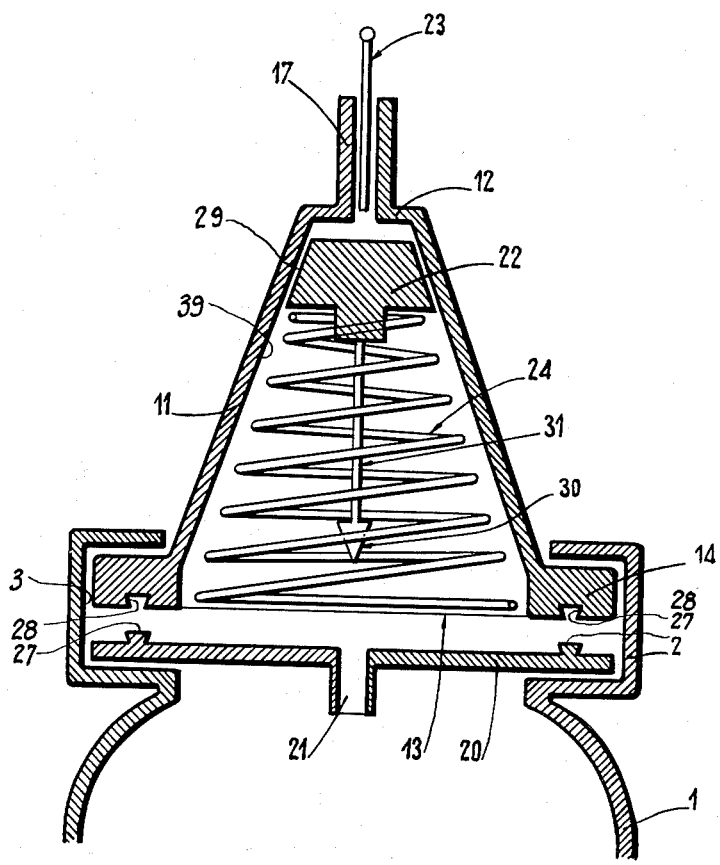
FIGURE 1 is a vertical sectional view illustrating the valve construction of this invention prior to assembly of the components into a sealing relationship.

The accompanying drawings will serve to provide detailed descriptions of certain specific embodiments of this invention. FIGURE 1 illustrates a container 1 which is adapted to hold fluid under pressure. The container is provided with a neck 2 which defines a relatively large opening at its top. The neck 2 in turn defines an annular channel 3 which is adapted to receive the annular flange 14 formed in the frustroconical hollow member 11. A base member 20 is also received within the channel 3 and this base member is provided with studs 27 which are adapted to be received by recesses 28 formed in the flange 14.

The container 1 shown in FIGURE 1 comprises a metallic container and the neck portion 2 is therefore adapted to be deformed in a known manner to provide a seal at the juncture with the valve mechanism. When the upper and lower surface of the neck 2 are pressed together, the studs 27 will be pressed into the recesses 28 and it will be apparent that a seal will be effected between the neck 2 and the base member 20, between the flange 14 and the base member 20, and between the flange 14 and the neck 2.

The base member 20 defines an opening 21 which provides communication between the container 1 and the hollow member 11. A dispensing outlet 17 is defined by the hollow member 11 whereby communication with the outside atmosphere can be effected. The piston means 22 is adapted to normally close off the outlet 17. This piston means is provided with outer inclined surfaces 29 which permit it to snugly interfit with the interior surface 39 of the member 11. The spring 24 normally rests on the base 20 and through its connection with the valve 22 normally closes off the outlet 17.

An actuating rod 23 is adapted to be connected to the valve 22 and it will be apparent that downward pressure on the rod will move the piston 22 away from the outlet 17 to permit dispensing of fluid. A second rod 31 is secured to the other side of the piston 22 and this rod terminates in a needle valve portion 30. When the rod 23 is pushed downwardly a given amount, the valve 30 will close off the opening 21. It will be apparent that with this arrangement, the valve structure provides for control of the amount of fluid to be dispensed from the container.

Figure 2:
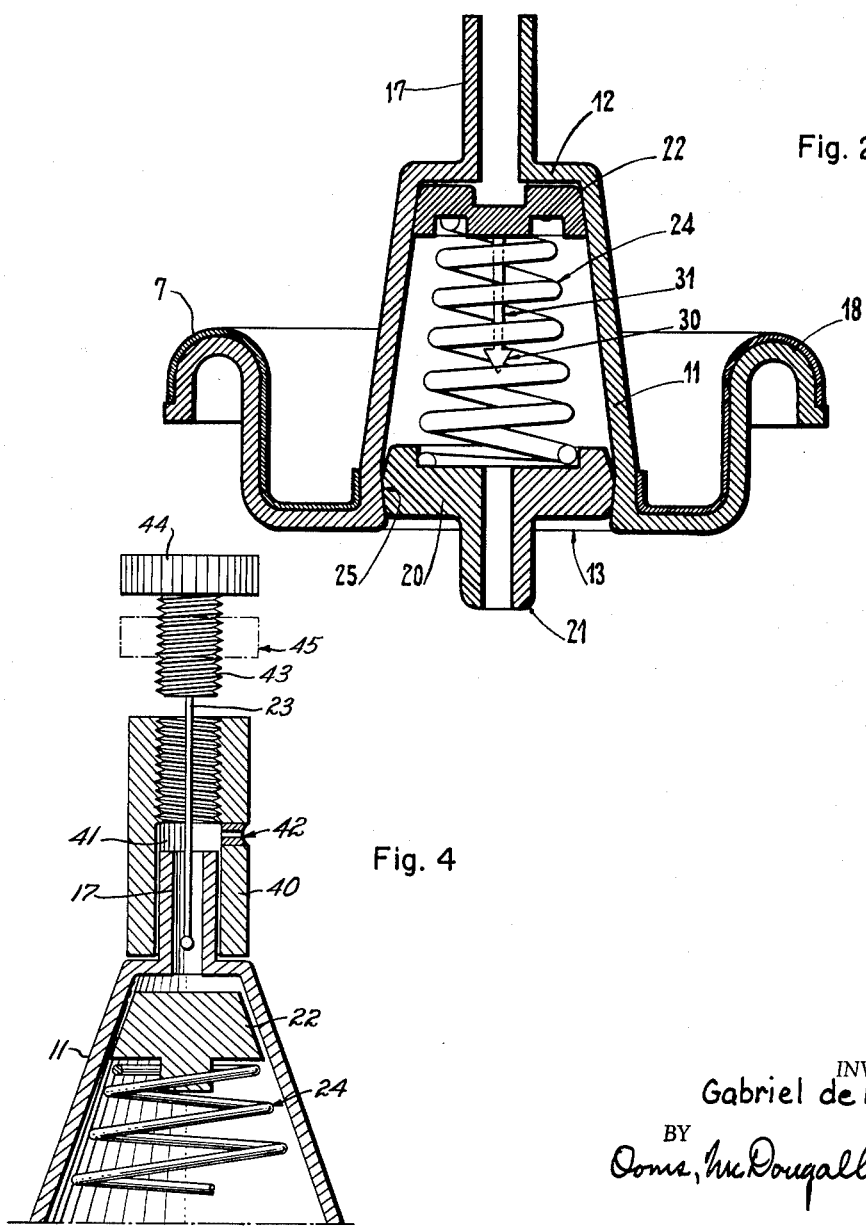
FIGURE 2 is a vertical sectional view of a valve construction illustrating various alternative components therefor.

FIGURE 2 illustrates a structure which is provided with its own deformable sealing means. Specifically, the flange of the hollow member 11 is provided with an annular return portion 18 and a metallic cup-shaped member 7 overlies this flange portion. This construction is particularly suitable for use in combination with glass bottles or the like whereby a seal can be effected by fitting the valve around the neck of the bottles and then pressing the member 7 and portion 18 into sealing engagement with this neck. It will also be noted that the use of a flange portion of the type illustrated provides for the application of the valve structure to containers having open ends substantially larger than the diameter of the hollow member 11. In this connection, it will be appreciated that the valve structure of FIGURE 2 can be utilized in combination with metallic or other deformable containers.

The other operating components of the structure shown in FIGURE 2 are substantially as described with respect to FIGURE 1. Thus, a base member 20 defining the opening 21, and an outlet 17 provide communication between the container and the outside atmosphere. Piston means 22 normally closes the outlet 17 in response to the action of the spring 24 and the internal pressure of the fluid. By providing an actuating means for moving the piston away from the container, dispensing can be effected and metered dispensing can be effected if the needle valve 30 is moved sufficiently to close off the opening 21.

It will be noted that the piston 22 is illustrated in a position closing off an outlet 17. This is true even though the piston is spaced somewhat from the upper wall of the member 11; however, wedging of the piston against the interior surface of the member 11 will effect the desired seal. When the piston 22 is pushed downwardly, a passage for the fluid is provided between the interior wall of the member 11 and the exterior surface of the piston. It will be noted that the needle valve 30 acts to control the rate of discharge in addition to its metering function since downward movement of the piston to a point where the valve 30 is just above the opening 21 will result in a maximum rate of discharge. An attempt to increase this rate by pressing further on the actuating member will cause the valve 30 to close off the opening 21.

Figure 3:
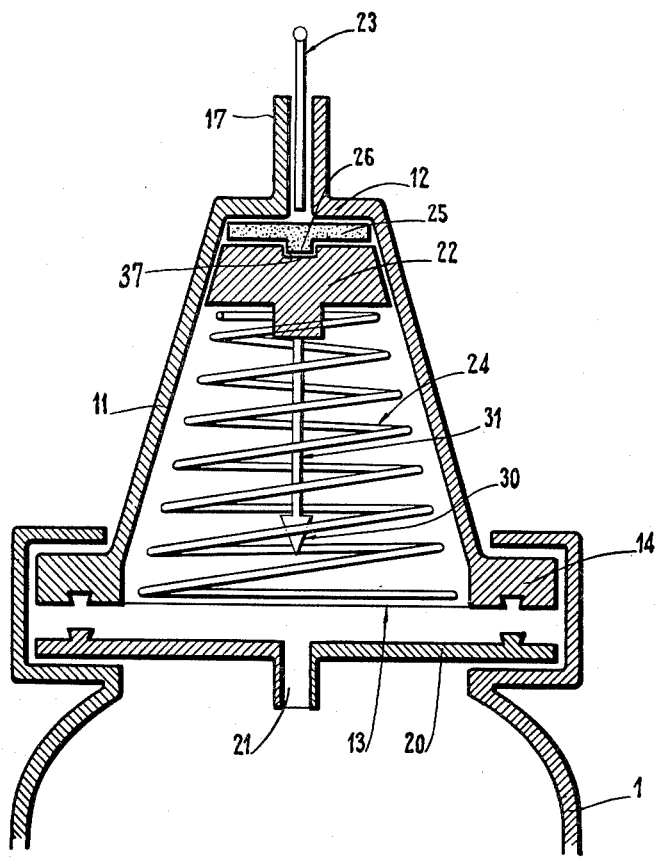
FIGURE 3 is a vertical sectional view illustrating an additional alternative construction; and, FIGURE 4 is a vertical sectional view illustrating a still further alternative construction.

FIGURE 3 illustrates a construction having the same design as the construction shown in FIGURE 1. However, in this embodiment, a resilient sealing member 25 is included in combination with the piston 22. The member 25 acts as the means for closing off the outlet 17, and, therefore, reliance on a tight closure between the piston 22 and the member 11 is not necessary. This modification is particularly advantageous since some fluids would tend to cause deterioration of the piston 22 and leaks could result. The packing member 25 on the other hand is not subject to the same amount of exposure as the piston 22 and therefore the danger of deterioration is minimized. The member 25 is provided with a protruding portion 26 which is received in a recess 37 formed in the piston 22 whereby the member 25 can be retained in the proper position during movement of the piston. This member should be formed of a material softer than the piston 22 whereby it will seal in an effective manner. The provision of this member obviates the need for close dimensional tolerances in the piston 22.

FIGURE 4 illustrates a still further modification in the valve structure. In this construction, the actuating rod 23 for moving piston 22 is connected to a knob 44. A sleeve member 40 is fitted over the outlet 17 and this member is internally threaded whereby the shank 43 of the knob 44 can be rotated and will move vertically with respect to the sleeve 40. An orifice 42 is formed in the sleeve 40 and it will be apparent that upon movement of the piston 22 from a blocking position, fluid will pass through the outlet 17 to the orifice 42 and then to the outside atmosphere. A resilient packing member 45 provides a seal to prevent leaking of fluid past the knob 44.

The use of the knob 44 provides a semiautomatic means for controlling the dispensing of fluid. Thus, the rate of issue of the fluid will depend on the number of turns of the knob since turning of the knob will control the position of the piston 22. The rate of dispensing can be maintained constant in an extremely accurate fashion since the knob 44 can be maintained in any desired position for indefinite periods.

The construction of this invention is considered advantageous due to the simplicity of its design and due to the small number of parts employed. The valve can be constructed of various plastics, such as of the polyamide type, and with rubber packings, and can therefore be provided quite economically. The fact that the valve can be employed with containers having a large neck portion is advantageous since the containers can be filled with virtually any material and can be evacuated with great efficiency.

The valve construction of this invention is also advantageous since the associated container can be refilled by passing fluid through the opening 17. This feature also materially adds to the economical characteristics of the valve construction.

It will be understood that various modifications can be made in the described valve construction which provide the characteristics of the invention without departing from the spirit thereof particularly as defined in the following claims.

That which is claimed is:

1. A dispenser for fluid under pressure comprising a container for housing fluid under pressure, which container has an open end, a valve means fixed in sealing relationship onto the open end of the container for sealing the pressure fluid therein, said valve means comprising a non-deformable, rigid, hollow housing of frusto-conical shape secured at its base to the open end of the container and having the dispensing opening at its apex portion with the inner surface of said housing being continuously tapered from the bottom to the top, a valve member of frusto-conical shape having its side walls tapered at an angle corresponding to the taper of the frusto-conical housing and dimensioned in cross-section for sealing engagement with the interior of the frusto-conical surface of the housing below the apex portion of the housing and wherein the valve means is mounted for axial movement within the housing between a sealing position responsive to axial displacement of the valve member in the direction toward the apex portion to bring the frusto-conical surfaces of the valve member and the interior of the housing into sealing engagement, and an open position responsive to axial displacement of the valve member in the direction away from the apex portion to provide an annular space between the tapered side walls of the valve member and the inner side of the tapered housing, an actuating rod accessible from outside the container and shiftable axially through the dispensing opening into engagement with the valve member for displacement of the valve member towards open position, and resilient means in operative engagement with the valve member constantly to urge the valve member towards said sealing position.

2. A dispenser as claimed in claim 1 in which the resilient means in operative engagement with the valve member comprises spring means within the housing.

3. A dispenser as claimed in claim 1 which includes an actuating means comprising a threaded cylinder fixed to said housing, a screw member threadably engaged in the threaded portion of the cylinder for axial displacement relative thereto responsive to turning movement of the screw member, said actuating rod being secured to said screw member for axial displacement toward and away from open position responsive to turning movement of the screw member.

4. A dispenser as claimed in claim 1 which includes a base member spanning the open end of the container and having a dispensing outlet, and a rod-like member extending from said piston in axial alignment with said dispensing outlet to engage said dispensing outlet in sealing relationship for arresting movement of the piston when in open position and to seal said outlet when the piston is displaced to open position.

5. A dispenser as claimed in claim 4 in which the container defines an inwardly facing annular groove around the open end and wherein the peripheral edges of the frusto-conical valve means and said base member are each clamped in said groove to effect a sealing relationship therebetween.

References Cited by the Examiner
UNITED STATES PATENTS

| | | | |
|---|---|---|---|
| 1,731,250 | 10/29 | McAtree | 222—501 |
| 1,934,197 | 11/33 | Mackay et al. | 222—501 |
| 2,129,511 | 9/38 | Tomkins et al. | 222—518 X |
| 2,723,055 | 11/55 | Beard. | |

FOREIGN PATENTS 588,703    12/59    Canada.

EVERETT W. KIRBY, *Primary Examiner.*

LOUIS J. DEMBO, *Examiner.*